(12) United States Patent
Hirvonen

(10) Patent No.: US 7,130,584 B2
(45) Date of Patent: Oct. 31, 2006

(54) METHOD AND DEVICE FOR IDENTIFYING AND PAIRING BLUETOOTH DEVICES

(75) Inventor: Petri M. Hirvonen, Vanhalinna (FI)

(73) Assignee: Nokia Corporation, Espoo (FI)

( * ) Notice: Subject to any disclaimer, the term of this patent is extended or adjusted under 35 U.S.C. 154(b) by 105 days.

(21) Appl. No.: 10/762,770

(22) Filed: Jan. 21, 2004

(65) Prior Publication Data

US 2004/0192206 A1    Sep. 30, 2004

Related U.S. Application Data

(60) Provisional application No. 60/453,424, filed on Mar. 7, 2003.

(51) Int. Cl.
*H04B 7/00* (2006.01)
*H04M 1/66* (2006.01)

(52) U.S. Cl. .................... 455/41.2; 455/41.3; 455/410; 455/411; 455/419; 380/258

(58) Field of Classification Search .............. 455/41.2, 455/41.3, 410, 411, 419, 420, 556, 566
See application file for complete search history.

(56) References Cited

U.S. PATENT DOCUMENTS

| | | | | |
|---|---|---|---|---|
| 5,485,163 | A * | 1/1996 | Singer et al. ................ | 342/457 |
| 6,735,430 | B1 * | 5/2004 | Farley et al. ............. | 455/414.1 |
| 2001/0048746 | A1 * | 12/2001 | Dooley ........................ | 380/258 |
| 2002/0088002 | A1 | 7/2002 | Shintani et al. ............. | 725/110 |
| 2002/0151327 | A1 * | 10/2002 | Levitt .......................... | 455/556 |
| 2003/0114145 | A1 * | 6/2003 | Boda et al. .................. | 455/412 |
| 2003/0122671 | A1 * | 7/2003 | Jespersen ................. | 340/568.1 |
| 2004/0179040 | A1 * | 9/2004 | Patel et al. .................. | 345/772 |
| 2004/0203384 | A1 * | 10/2004 | Sugikawa et al. ......... | 455/41.2 |
| 2004/0203385 | A1 * | 10/2004 | Narayanan et al. ........ | 455/41.2 |

FOREIGN PATENT DOCUMENTS

GB    2408129 A * 5/2005

OTHER PUBLICATIONS

Sony (Integrated Remote Commander: operating Instructions, document 3-048-64674(1), RM-AV2100/AV2100B, 2000, pp. 76.*

* cited by examiner

*Primary Examiner*—Joseph Feild
*Assistant Examiner*—Julio Perez
(74) *Attorney, Agent, or Firm*—Ware, Fressola, Van Der Sluys & Adolphson LLP

(57) ABSTRACT

A method of revealing the device identity of a recipient Bluetooth device. When the recipient device is turned on, it displays the device identity. A user enters the device identity of the recipient device into a sending Bluetooth device in order to establish the initial communication link between the sending and recipient devices. Once the initial communication link is established, the devices are paired. It is no longer necessary to enter the device identity of the recipient device into the sending device in order to establish further communication link. Furthermore, if the recipient device has already been turned on when the user wants to establish the initial communication link, the device identity is displayed when the user sends a message or signal from the sending device to the recipient device.

28 Claims, 3 Drawing Sheets

METHOD AND DEVICE FOR IDENTIFYING AND PAIRING BLUETOOTH DEVICES

This application is based on and claims priority of U.S. Provisional application No. 60/453,424, filed Mar. 7, 2003.

FIELD OF THE INVENTION

The present invention relates generally to a so-called Bluetooth communications system operating at radio frequencies around 2.45 GHz and, more particularly, to the identification of a Bluetooth device when communicating with another Bluetooth device.

BACKGROUND OF THE INVENTION

A Bluetooth system provides a communication channel between two electronic devices via a short-range radio link. In particular, the Bluetooth system operates in the radio frequency range around 2.45 GHz in the unlicensed Industrial-Scientific-Medical (ISM) band. The Bluetooth radio link is intended to be a cable replacement between portable and/or fixed electronic devices. The portable devices include mobile phones, communicators, audio headsets, laptop computers, other GEOS-based or palm OS-based devices and devices with different operating systems.

The Bluetooth operating frequency is globally available, but the permissible bandwidth of the Bluetooth band and the available RF channels may be different from one country to another. Globally, the Bluetooth operating frequency falls within the 2400 MHz to 2497 MHz range. In the U.S. and in Europe, a band of 83.7 MHz bandwidth is available, and the band is divided into 79 RF channels spaced 1 MHz apart. Bluetooth network arrangements can be either point-to-point or point-to-multipoint to provide connection links among a plurality of electronic devices. Two to eight devices can be operatively connected into a piconet, wherein, at a given period, one of the devices serves as the master while the others are the slaves. Several piconets may form a larger communications network known as a scatternet, with each piconet maintaining its independence. The baseband protocol for a Bluetooth system combines circuit and packet switching. Circuit switching can be either asynchronous or synchronous. Up to three synchronous data (logical) channels, or one synchronous and one asynchronous data channel, can be supported on one physical channel. Each synchronous channel can support a 64 Kb/s transfer rate while an asynchronous channel can transmit up to 721 Kb/s in one direction and 57.6 Kb/s in the opposite direction. If the link is symmetric, the transfer rate in the asynchronous channel can support 432.6 Kb/s. A typical Bluetooth system consists of a radio link, a link control unit and a support unit for link management and host terminal interface functions. The Bluetooth link controller carries out the baseband protocols and other low-level routines. Link layer messages for link set-up and control are defined in the Link Manager Protocol (LMP). In order to overcome the problems of radio noise interference and signal fading, frequency hopping is currently used to make the connections robust.

Currently, each of the 79 RF channels is utilized by a pseudo-random hopping sequence through the Bluetooth bandwidth. The hopping sequence is unique for each piconet and is determined by the Bluetooth device address of the master whose clock is used to determine the phase of the hopping sequence. The channel is divided into time slots of 625 μs in length and numbered according to the master clock, wherein each time slot corresponds to an RF hop frequency, and wherein each consecutive hop corresponds to a different RF hop frequency. The nominal hop rate is 1600 hops/s. All Bluetooth devices participating in the piconet are time and hop synchronized to the channel. The slot numbering ranges from 0 to $2^{27}-1$ and is cyclic with a cycle length of $2^{27}$. In the time slots, master and slave devices can transmit packets. Packets transmitted by the master or the slave device may extend up to five time slots. The RF hop frequency remains fixed for the duration of packet transmission.

When one Bluetooth device communicates with another Bluetooth device, one is a sending device and the other is a recipient device. There is a need to identify the sending device when pairing the sending device with the recipient device. This is necessary because, without such identification and paring, it is possible that a sending device in one's home may be accidentally connected to a recipient device of a next door neighbor, which can be just behind one of the home's walls. If the sending device is used to send images to a Bluetooth image viewer, for example, it is undesirable that the images accidentally appear on the neighbor's screen.

In general, when an end-user wishes to establish communication between a sending Bluetooth device and a recipient Bluetooth device, the user must key in the identity of the recipient device to the sending device. In the example illustrated above, the communication between the image sender and the image viewer can only be established after the end-user keys in the identification code of his or her own image viewer to the image sending device. Because each image viewer has its unique identification code, it is highly unlikely that the end-user accidentally sends his or her images to the neighbor's image viewer. The sending device in the above example can be a mobile phone and the image viewer can be a TV Dongle.

In a household that has a number of Bluetooth devices, the end-user of the devices must know the identification code for each of the devices that can or will be used as recipients. The identification code can be the last N digits of the serial number of the Bluetooth device, for example. For practical reasons, the serial number may be on a label in the battery compartment, or on a label on the bottom of a device. In order to find out the serial number, the end-user may have to take out the batteries from the battery compartment or to flip over a heavy device.

It is thus advantageous and desirable to provide a method and device for revealing the identification code of a Bluetooth device whenever the end-user wants to access it, without requiring the end-user to memorize the identification code or to go through a number of unnecessary steps to find such code.

SUMMARY OF THE INVENTION

The present invention provides a method and device for revealing the device identity of a recipient Bluetooth device so as to allow a user to use the device identity to establish an initial communication link between the recipient device and a sending Bluetooth device.

According to the first aspect of the present invention, there is provided a method of providing an identity of a communication device in a wireless communication system for establishing a communication link between the communication device with a further communication device based on the identity of the communication device. The method comprises:

providing a signal in the communication device in response to an action on the communication device; and outputting, in response to the signal, the identity in a perceptually noticeable form, so as to allow a user to use the outputted identity to establish the communication link.

According to the present invention, the outputting step comprises displaying on a displaying device a visible message indicative of the identity, or announcing on a sound producing device an audible message indicative of the identity. The displaying device can be a displaying screen on the communication device or a displaying screen operatively connected to the communication device.

According to the present invention, the action can be the powering up of the communication device, but the action can also be the sending of a communication signal from the further communication device to said communication device.

According to the present invention, the communication link comprises an initial communication link for pairing the communication device with the further communication device, and wherein the outputting step is carried out only if the communication link is the initial communication link.

According to the second aspect of the present invention, there is provided a method of establishing an initial communication link between a first communication device and a second communication device, the first communication device having a device identity. The method comprises:

outputting the device identity in a perceptually noticeable form, in response to an action on the first communication device; and providing to the second communication device information indicative of the outputted identity.

According to the present invention, the information providing step is carried out by a user.

According to the third aspect of the invention, there is provided a communication device having a device identity in a wireless communication system, the wireless communication system comprising at least a further communication device for communicating with the communication device. The communication device comprises:

a storing device for storing data indicative of the device identity; and an output device, operatively connected to the storing device, for providing information in a perceptually noticeable form indicative of the device identity, so as to allow a user to use the provided information to establish an initial communication link between the communication device and the further communication device.

According to the present invention, the communication device comprises a displaying device operatively connected to output device for displaying a visible message indicative of the device identity. Alternatively, the output device is operatively connected to a displaying device for displaying a visible message indicative of the device identity on the displaying device.

The present invention will become apparent upon reading the description taken in conjunction with FIG. 1a to FIG. 2b.

DETAILED DESCRIPTION OF THE INVENTION

Figure 1A:
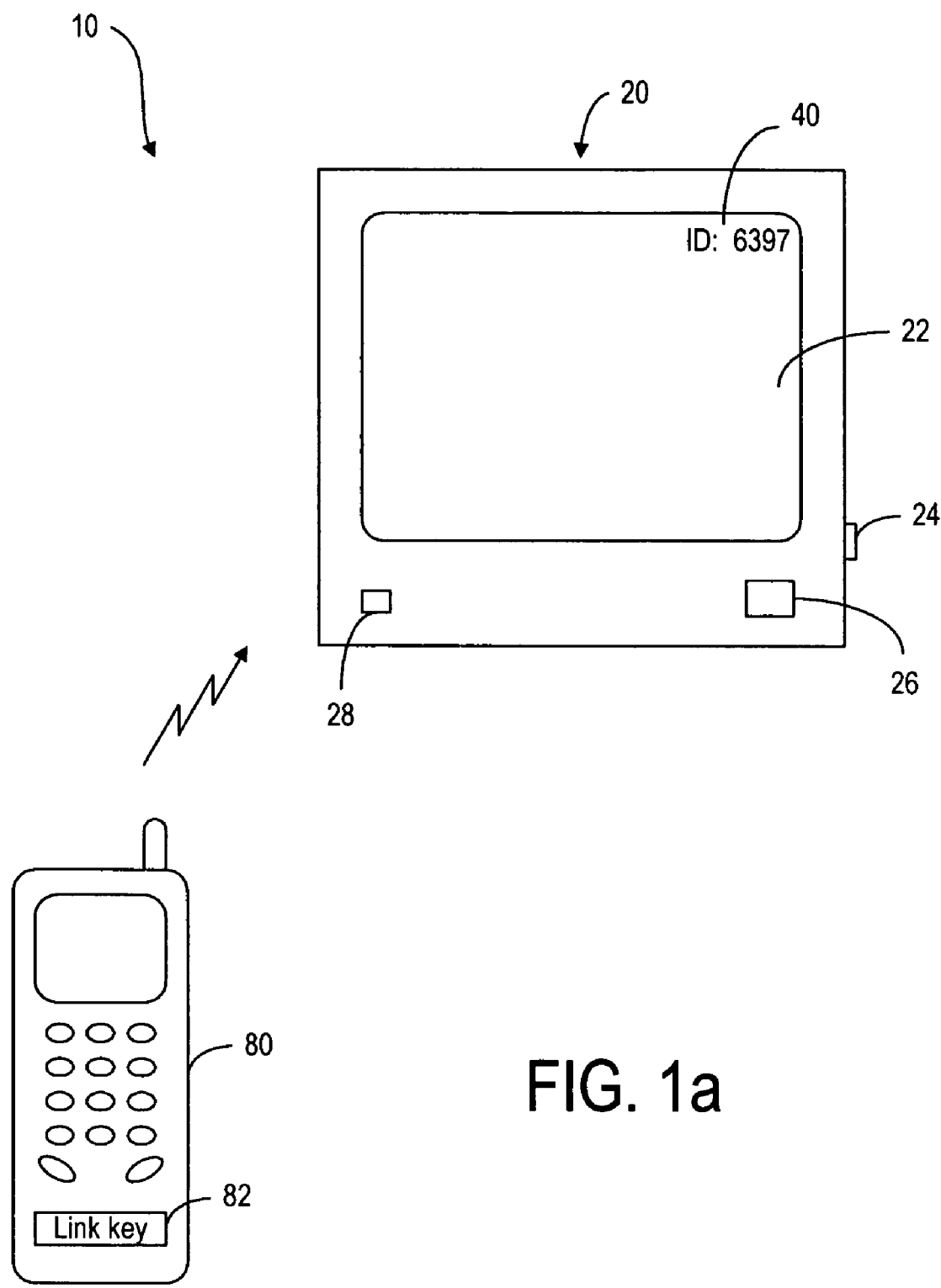
FIG. 1a is a schematic representation showing a Bluetooth communication system comprising a sending device and a recipient device, wherein the recipient device has a screen for displaying its identification code.

FIG. 1a is a schematic representation showing a recipient device 20 and a sending device 80 in a Bluetooth communication network 10. As shown, the sending device 80 is a mobile phone and the recipient device 20 is a Bluetooth television set (TV) (or a Bluetooth image frame, media frame, image display device, image receiving device and the like). The mobile phone 80 is capable of sending images to the TV 20 for display. When the end-user wishes to establish a communication link between the recipient device 20 and the sending device 80, the power of both devices must be turned on. When these two devices are paired for communications for the first time, it is necessary that the identity of the recipient device 20 is entered into the sending device 80. According to the preferred embodiment of the present invention, when the power of the recipient device 20 is turned on, the identification code 40 of the recipient device 20 is automatically shown on the screen 22 at least for a period of time, long enough for the end-user to see and use it. The end-user will then enter the identification code 40 into the sending device 80 in order to start the communication between the devices 20 and 80. As such, the devices 20 and 80 are paired. With the identification code 40 automatically shown, the end-user can easily find out the identification code of the recipient device. The identification code 40 of the recipient device 20, in this case, is used as a device address. It is preferred that after the sending device 80 has been paired with the recipient device 20, a link key is generated in the memory 82 of the sending device 80. Similarly, a link key is generated in the memory 58 of the recipient 20 (see FIGS. 2a and 2b). For example, the link key in the memory 82 of the sending device 80 can be the Bluetooth address of the sending device 80 and the identification code 40 of the recipient 20. As such, when the recipient device 20 and the sending device 80 are linked up again at a later time, it is possible for the sending device 80 to recognize the recipient device 20 as an authorized recipient by remembering the earlier pairing.

It should be noted that the electrical power of the recipient device 20 can be turned on by manually switching the power on switch 24, or by using a remote controller (not shown) to activate a remote on/off switch 26. While it is preferred that the identification code 40 is revealed when the recipient device 20 is turned on, it is also possible to reveal the identification code 40 by pushing a button 28. In that respect, the identification code 40 is revealed to the end-user whenever the end-user takes an action on the recipient device 20, producing a signal that causes the revelation of the identification code 40. Furthermore, if the power of the recipient device 20 is already turned on when the end-user wants to establish communications between the recipient 20 and another sending device 80', the identification code 40 of the recipient device 20 is automatically revealed if the sending device 80' has not already been paired with the recipient device 20. Accordingly, the end-user does not have to turn off the recipient device 20 and then turn on the recipient device 20 again in order to see the identification code 40. However, if the sending device 80' has been previously paired with the recipient 20, there is no need for the recipient device 20 to reveal its identification code 40.

Figure 1B:
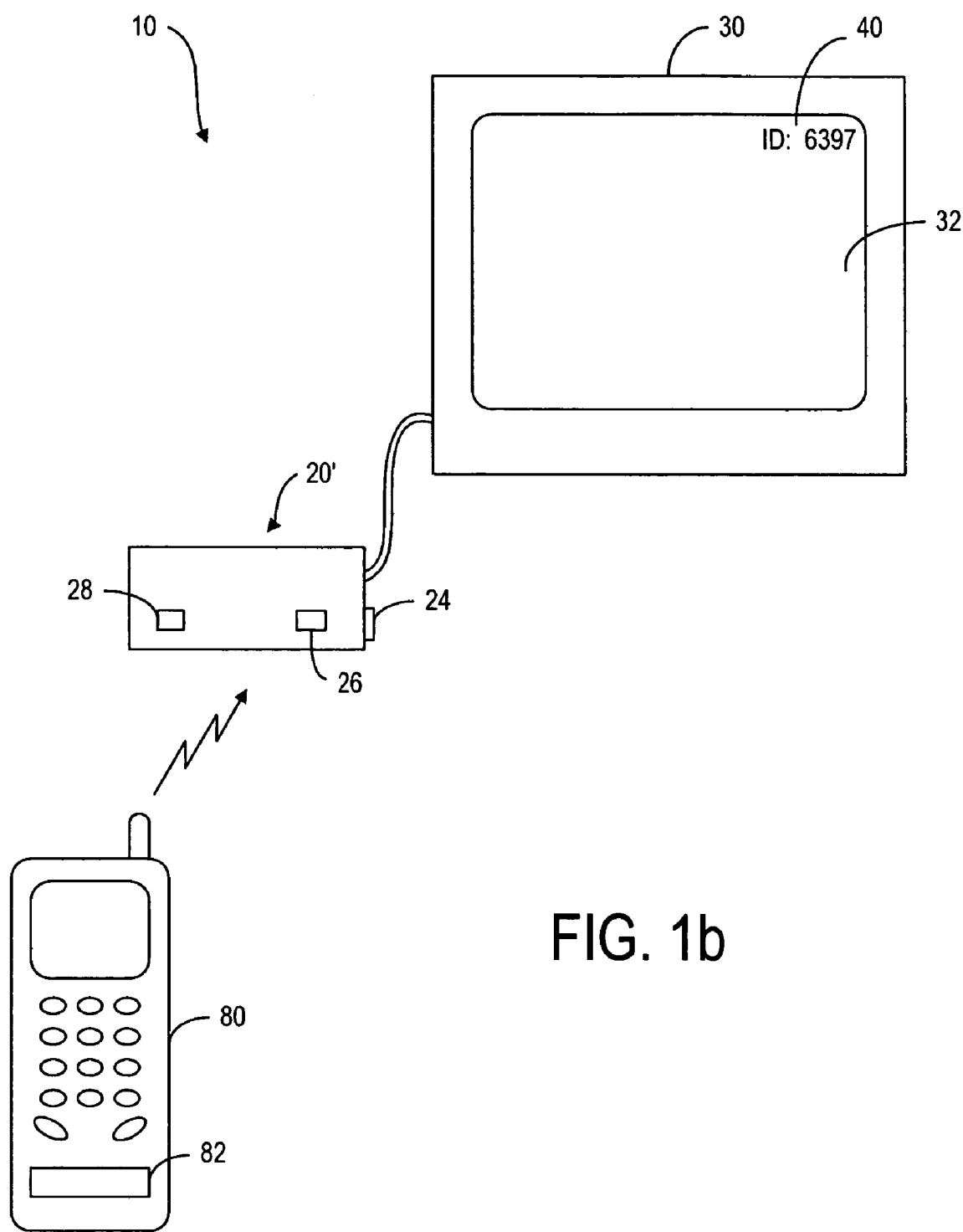
FIG. 1b is a schematic representation showing a Bluetooth communication system comprising a sending device and a recipient device, wherein the recipient does not have a screen for displaying its identification code.

It should be noted that some Bluetooth recipient devices may not have a screen for displaying the identification code. For example, a Bluetooth TV Dongle or image receiver, which is connected to a non-Bluetooth TV set, can be used to receive images from a Bluetooth sending device and convey the received images to the TV set for display. As shown in FIG. 1b, the recipient device 20' does not have a screen, but it can use the screen 32 of a connected TV set 30 to display the identification code 40.

Figure 2A:
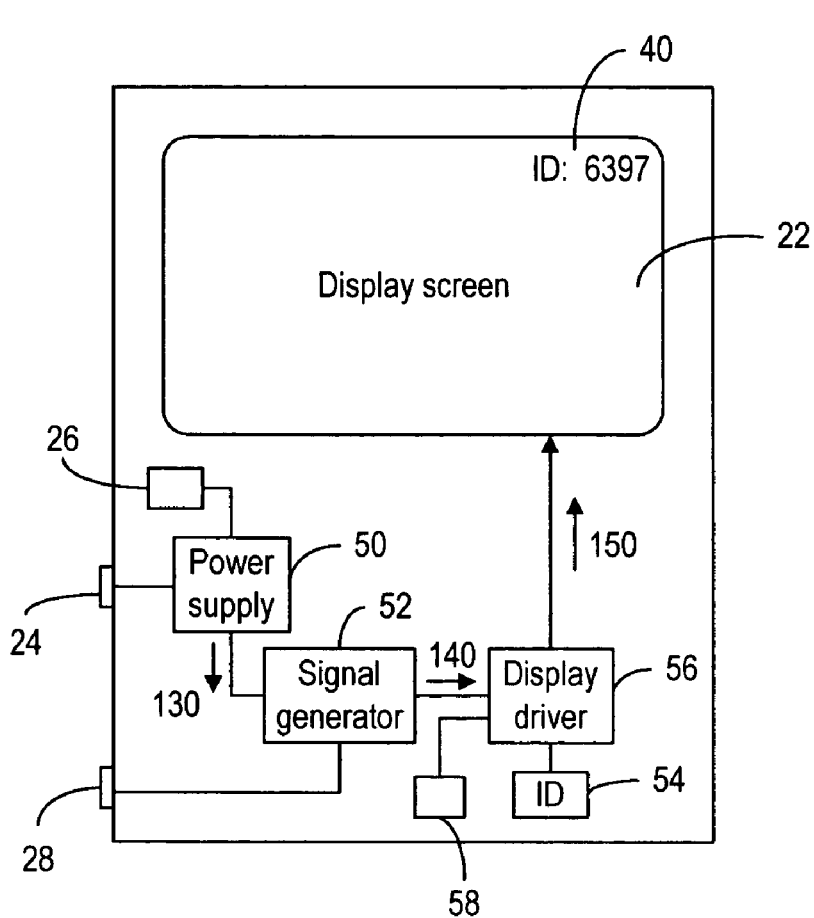
FIG. 2a is a schematic representation showing a preferred embodiment of the present invention.
Figure 2B:
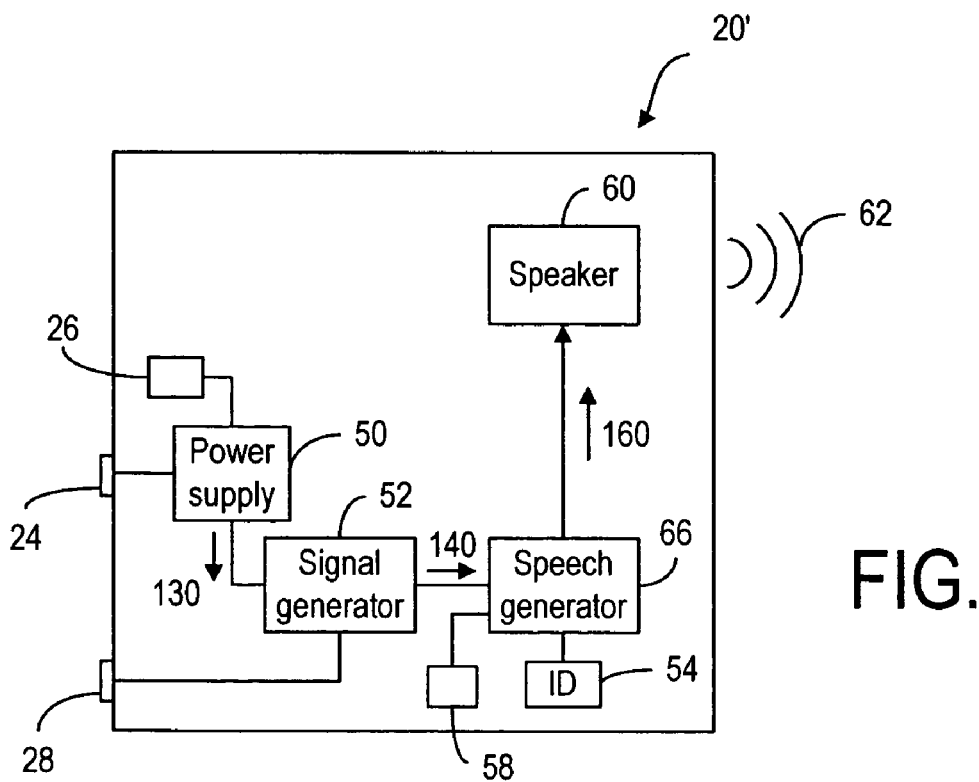
FIG. 2b is a schematic representation showing an alternative embodiment of the present invention.

FIG. 2a is a schematic representation showing an identification code revealing mechanism, according to the present invention. As shown in FIG. 2a, the recipient device 20 has a power supply (or one or more batteries, or charger) 50, which can be turned on via the manual switch 24 or a remote-controlled switch 26. When the power supply is turned on, it provides a signal 130 to a signal generator 52. The signal generator 52 provides a signal 140 to a display driver 56. The recipient device 20 has a storage means 54 for storing an electronically readable code indicative of the identification code 40 of the recipient device. In response to the signal 140, the display driver 56 reads the identification code from the storage means 54 and generates numeric data 150 for display on the screen 22. It is preferred that the recipient device 20 generates a link key in its memory 58 after it is paired with a sending device. As such, when the already-paired sending device wants to link up with the recipient device 20 at a later time, the recipient device 20 does not display its identification code 40 again. If the recipient device is a Bluetooth TV set that has an image displaying screen (FIG. 1a) or a Bluetooth image receiver connected to a non-Bluetooth device with an image displaying screen (FIG. 1b), the identification code 40 can be displayed. However, if the recipient device 20 does not have such a displaying screen or is not associated with one, it is possible to provide on the recipient device a small screen (for example, four 8-segment alphanumeric displays) for showing the identification code. Alternatively, the identification code 40 can be revealed as sound 62 through a speaker 60 as shown in FIG. 2b. As shown in FIG. 2b, the signal 140 is provided to a speech generator 66, which announces the identification code one or more times through the speaker 60. If the end-user missed the announcement, he or she may push to button 28 to hear it again.

As mentioned earlier, after the identification code of the recipient is entered into the sending device in the initial session, the communication link between these two devices can be established based on the associated link key. As the link key indicative of the identification code of the recipient device is stored in the sending device, it is not necessary to enter the identification code of the same recipient device in future sessions. The recipient device can be programmed to accept automatically all sent messages or images from a once-paired sending device. However, when a new sending device tries to establish a communication link with the recipient device, the recipient device will show the identification code so as to allow a user to enter the code to the new sending device.

After the initial pairing, the recipient device 20 can find out the device address of the sending device 80. In that case, the roles of the devices 20 and 80 can be reversed if so desired.

As mentioned above, each Bluetooth device has a storage means to store one or more link keys associated with other Bluetooth devices that have been paired with it before. For example, the link keys associated with ten already-paired devices can be stored. If more devices are to be paired, the identification code of the already paired devices can be deleted based on a first-in-first-out principle, for example.

In sum, the present invention provides a method and device for revealing an identification code of a wireless communication device in a perceptually noticeable form in response to an action on the device by an end-user. The perceptually noticeable form can be a display on a display means, or an announcement on a speaker, for example. The action can be turning on the power of the device, or pushing a certain button on the device.

The present invention is applicable to a Bluetooth system, as well as other local wireless connectivity bearers. The sending device can be a mobile terminal, an image acquiring device, or an image storage device, for example. The recipient device can be an image viewer, or an image receiver, for example. However, the sending device can be a sound recording or storage system and the recipient device can be a sound producing system.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of revealing an identity of a first electronic device, the first electronic device configured to store data indicative of the identity, said method comprising:
   providing a signal in the first electronic device in response to an action on the first electronic device; and
   retrieving the stored data in the first electronic device, in response to the signal, for causing the identity of the first electronic device to be outputted in a perceptually noticeable form, so that the outputted identity can be used to establish a wireless communication link between the first electronic device and a second electronic device.

2. The method of claim 1, wherein the action comprises powering up the first electronic device.

3. The method of claim 1, wherein the first electronic device comprises a displaying device, for displaying a visible message indicative of the identity.

4. The method of claim 1, wherein the first electronic device is operatively connected to a displaying device, so as to allow the displaying device to display a visible message indicative of the identity.

5. The method of claim 1, wherein the first electronic device comprises a sound producing device, for announcing an audible message indicative of the identity on the sound producing device.

6. The method of claim 1, wherein the action comprises sending a communication signal from the second electronic device device to said first electronic device.

7. The method of claim 1, wherein the first electronic device and the second electronic device are Bluetooth devices.

8. The method of claim 1, wherein the first electronic device comprises a Bluetooth image receiver.

9. The method of claim 1, wherein the first electronic device comprises a Bluetooth television set.

10. The method of claim 1, wherein the wireless communication link comprises an initial communication link for pairing the first electronic device with the second electronic device, and wherein said outputting is carried out only if the wireless communication link is the initial communication link.

11. A method of establishing an initial communication link between a first electronic device and a second electronic device, the first electronic device having a device identity, the first electronic device configured for storing data indication of the device identity, said method comprising:
retrieving the stored data in the first electronic device for causing the device identity of the first electronic device to be outputted in a perceptually noticeable form, in response to an action on the first electronic device; and
providing to the second electronic device information indicative of the outputted identity.

12. The method of claim 11, wherein the action comprising powering up the first electronic device.

13. The method of claim 11, wherein the action comprises sending a signal from the second electronic device to the first electronic device.

14. The method of claim 11, said information providing can be initiated by a user.

15. The method of claim 11, wherein the first electronic device comprises an image viewer.

16. The method of claim 11, wherein the first electronic device comprises an image receiver.

17. The method of claim 11, wherein the first electronic device comprises a Bluetooth television set.

18. The method of claim 11, wherein the first electronic device comprises a Bluetooth image displaying device.

19. The method of claim 11, wherein the first electronic device comprises a Bluetooth image receiver operatively connected to an image displaying device.

20. The method of claim 11, wherein the second electronic device comprises a mobile terminal.

21. An electronic device having a device identity, said electronic device comprising:
a storing device for storing data indicative of the device identity of the electronic device; and
an outputting device, operatively connected to the storing device, for providing information and causing the information to be outputted in a perceptually noticeable form indicative of the device identity, so that the provided information can be used to establish an initial wireless communication link between the electronic device and a different electronic device.

22. The electronic device of claim 21, further comprising a displaying device for displaying a visible message indicative of the device identity.

23. The electronic device of claim 21, wherein the outputting device is operatively connected to a displaying device for displaying a visible message indicative of the device identity.

24. The electronic device of claim 21, comprising an image viewer.

25. The electronic device of claim 21, comprising an image receiver.

26. The electronic device of claim 21, comprising a Bluetooth image receiver operatively connected to a non-Bluetooth image display device.

27. An electronic device having a device identity, comprising:
means for storing data indicative of the device identity of the electronic device; and
means, operatively connected to the storing, device, for providing information and causing the information to be outputted in a perceptually noticeable form indicative of the device identity, so that the provided information can be used to establish an initial wireless communication link between the electronic device and a different electronic device.

28. The electronic device of claim 27, wherein said providing means comprises means for displaying a visible message indicative of the device identity and wherein the different electronic device comprises a mobile terminal.

* * * * *

UNITED STATES PATENT AND TRADEMARK OFFICE
CERTIFICATE OF CORRECTION

PATENT NO. : 7,130,584 B2  
APPLICATION NO. : 10/762770  
DATED : October 31, 2006  
INVENTOR(S) : Petri Hirvonen It is certified that error appears in the above-identified patent and that said Letters Patent is hereby corrected as shown below:

In column 6, line 54, "device device" should be --device--.

In column 8, line 25, "storing," should be --storing--.

Signed and Sealed this

Twenty-seventh Day of March, 2007

JON W. DUDAS  
*Director of the United States Patent and Trademark Office*